(12) United States Patent
St. Germain et al.

(10) Patent No.: US 12,180,722 B2
(45) Date of Patent: Dec. 31, 2024

(54) MESH SEAM CONNECTION ELEMENT

(71) Applicant: LOUISIANA-PACIFIC CORPORATION, Nashville, TN (US)

(72) Inventors: Brian St. Germain, Mt. Juliet, TN (US); Heidi Moore, Mt. Juliet, TN (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 662 days.

(21) Appl. No.: 17/171,040

(22) Filed: Feb. 9, 2021

(65) Prior Publication Data

US 2021/0164242 A1  Jun. 3, 2021

Related U.S. Application Data

(63) Continuation of application No. 15/970,772, filed on May 3, 2018, now Pat. No. 10,914,082.

(60) Provisional application No. 62/500,562, filed on May 3, 2017.

(51) Int. Cl.
| | | |
|---|---|---|
| *E04F 21/165* | (2006.01) | |
| *B32B 5/02* | (2006.01) | |
| *B32B 7/12* | (2006.01) | |
| *B32B 9/00* | (2006.01) | |
| *B32B 27/12* | (2006.01) | |
| *E04C 2/10* | (2006.01) | |
| *E04C 2/38* | (2006.01) | |
| *E04F 13/04* | (2006.01) | |
| *E04F 13/08* | (2006.01) | |
| *E04F 15/02* | (2006.01) | |
| *E04F 15/18* | (2006.01) | |

(52) U.S. Cl.
CPC ............ *E04F 21/1657* (2013.01); *B32B 5/02* (2013.01); *B32B 7/12* (2013.01); *B32B 9/00* (2013.01); *B32B 27/12* (2013.01); *E04C 2/10* (2013.01); *E04C 2/38* (2013.01); *E04F 13/04* (2013.01); *E04F 13/0898* (2013.01); *E04F 15/02016* (2013.01); *E04F 15/187* (2013.01); *E04F 21/1655* (2013.01)

(58) Field of Classification Search
CPC ...... E04F 21/1657; E04F 21/1655; E04C 2/10
See application file for complete search history.

(56) References Cited

U.S. PATENT DOCUMENTS

| | | | | |
|---|---|---|---|---|
| 6,073,406 A * | 6/2000 | Kearney | ................. | E04F 13/06 |
| | | | | 52/287.1 |
| 6,539,680 B2 * | 4/2003 | Kunz | .................... | E04F 13/068 |
| | | | | 52/287.1 |

(Continued)

*Primary Examiner* — Babajide A Demuren
(74) *Attorney, Agent, or Firm* — Wayne Edward Ramage; Baker Donelson

(57) ABSTRACT

A mesh tape bonded to the outer edge or outward side of sheet panel products. The mesh tape is applied so that the tape overhangs the edge of the panel for the purpose of adjoining to the adjacent panel following installation of the panels at a job site. The mesh may be applied to two edges of the sheet panel, one along the panel width and another along the panel length. When installed, the panel edge with the mesh tape applied is overlapped with the edge of an adjacent panel that does not have tape applied, both along the length and width, thus allowing for a faster, more robust and reliable installation of panel sheathing.

19 Claims, 5 Drawing Sheets

FOUR ADJACENT PANELS

(56) References Cited

U.S. PATENT DOCUMENTS

| | | | | |
|---|---|---|---|---|
| 7,673,428 B1* | 3/2010 | Smythe | ............... | E04F 13/06 |
| | | | | 52/287.1 |
| 2006/0070331 A1* | 4/2006 | Yakobics | ............ | E04F 13/04 |
| | | | | 52/581 |
| 2006/0236626 A1* | 10/2006 | Smythe | ............. | E04F 13/068 |
| | | | | 52/272 |
| 2006/0283115 A1* | 12/2006 | Robertson | ......... | B29C 66/304 |
| | | | | 52/364 |
| 2013/0186024 A1* | 7/2013 | Rosentiel | ............ | E04F 13/06 |
| | | | | 52/255 |
| 2017/0081562 A1* | 3/2017 | Rosenthal | ......... | E04F 19/022 |

* cited by examiner

MESH SEAM CONNECTION ELEMENT

This application is a continuation of U.S. patent application Ser. No. 15/970,772, filed May 3, 2018, which claims benefit of and priority to U.S. Provisional Application No. 62/500,562, filed May 3, 2017, and is entitled to priority to that filing date. The specifications, drawings, and complete disclosures of U.S. Provisional Application No. 62/500,562 and U.S. patent application Ser. No. 15/970,772 are incorporated herein by specific reference in their entireties for all purposes.

FIELD OF INVENTION

This invention relates to a mesh seam connection element factory applied to sheet panel edges.

BACKGROUND OF THE INVENTION

Sheet panels, including, but not limited to, plywood, Oriented Strand Board (OSB), drywall, fiberglass mat gypsum, magnesium oxide coated OSB, and cement board, are common building materials used in various types of construction (e.g., Type I, II, III and V). These panels are used within various types of exterior and interior walls, floor, and roof assemblies. Panels are manufactured in sizes that help facilitate transportation and delivery to the job site, as well as allow for handling and installation with common tools, fasteners, and labor practices.

During installation some panel types require gapping (e.g., ⅛ inch spacing between adjacent panels) to allow for panel expansion and contraction without deformation during service life. The gap between panels is referred to as the panel seam. If the panel has minimal expansion and contraction characteristics, the installation may allow adjacent panels to touch. However, buildings and the materials themselves are rarely so precise in dimensional tolerances that every panel within the installation can be installed with all edges tight to one another, and the gapping between adjacent panels is likely to vary within the installation.

Following installation, the layout of the panel edges, whether installed with a gap or with edges touching, typically is easily visible. As the panels usually are just one component of the wall, floor, or roof system, the panel seams are often sealed and/or joined for a variety of applications and/or purposes. Aesthetics, fire performance, air sealing, vapor sealing, bulk water sealing and acoustic performance are some, but not all, of the reasons why the panel edges are sealed and/or joined.

In some applications, the panels are installed on the outward side of the exterior walls and will become the base for exterior insulating systems and/or exterior cladding. The International Building Code (IBC) and International Residential Code (IRC) both require that a Weather Resistant Barrier (WRB) be used between the exterior cladding and the wall panels. The requirements for WRBs are outlined in International Code Congress, Evaluation Services (ICC-ES) Acceptance Criteria AC 212 or AC 310.

One type of WRB is fluid applied on the job site. One of the challenges with fluid applied WRBs is that the panel seams must be properly joined. As discussed above, panels may expand or contract during their service life. In addition, buildings often have movement caused by settling of the foundation, drying of structural components, and the like, as well as environmental forces such as wind, heating and cooling, and other environmental and seasonal factors. Any movement may create breaks in the panel seam which would compromise the system performance.

With fluid applied WRB systems, a common method to seal the seams is to apply a fiberglass (or similar) reinforcing tape between the two panels. This tape would overlap the two panels equally. To facilitate installation, the fiberglass tape typically has an adhesive applied. Following installation of the fiberglass tape, the installer would then apply a sealant over the tape to join the panel together at the seam. The sealant is typically applied to extend beyond each edge of the fiberglass tape width to ensure adequate bonding to the fluid-applied WRB surface. After the panel sealant is cured to both the fiberglass tape and the fluid applied WRB that was previously applied to the panels, a robust monolithic barrier is created.

The prior art method of applying the fiberglass tape and subsequently sealing on-site is time consuming, and requires large volumes of sealant for proper installation as the sealant must both saturate and completely cover the tape and extend beyond the width of the tape. Further, the prior art method is prone to numerous installation variances that could compromise the integrity of the finished system. These installation variances include, but are not limited to, the following:

(1) Tape misalignment, causing a weakness on one side of the panel.
(2) Wrinkles that occur during application of the tape (tape is often applied over long continuous seams, and misalignment during installation that is corrected will result in a wrinkle in the tape). Wrinkles will upset adhesion of the sealant and create a potential failure point.
(3) Poor adhesion to the panel. At the time of installation, the wall panels on which the tape is being installed has been exposed to potential contamination from the job site conditions. This contamination may adversely impact the tape adhesion and subsequent adhesion of the sealant.
(4) Installing tape on each of the panel seams on the entire assembly requires a significant amount of time and labor costs.

SUMMARY OF THE INVENTION

In various exemplary embodiments, the present invention comprises a mesh tape that is bonded to the outer edge or outward side of sheet panel products. The mesh tape is applied so that the tape overhangs the edge of the panel for the purpose of adjoining to the adjacent panel following installation of the panels at a job site. In one embodiment, the mesh is applied to two edges of the sheet panel, one along the panel width and another along the panel length. When installed, the panel edge with the mesh tape applied is overlapped with the edge of an adjacent panel that does not have tape applied, both along the length and width. The present invention thus allows for a faster, more robust and reliable installation.

The mesh tape (e.g., fiberglass reinforcing tape) is applied and affixed to the desired sides or edges of a panel during the panel manufacturing process. In one embodiment, the tape is applied directly to the panel prior to application of the factory WRB coating. The tape is thereby sandwiched between the base panel and WRB coating, and when cured, becomes tightly bonded and integrated to the panel with WRB coating. Additional adhesives and coating thickness may be used to ensure performance. In several embodiments, the product thus comprises a construction panel with factory-applied (or "pre-applied") WRB coating and mesh tape.

DETAILED DESCRIPTION OF EXEMPLARY EMBODIMENTS

Figure 1:
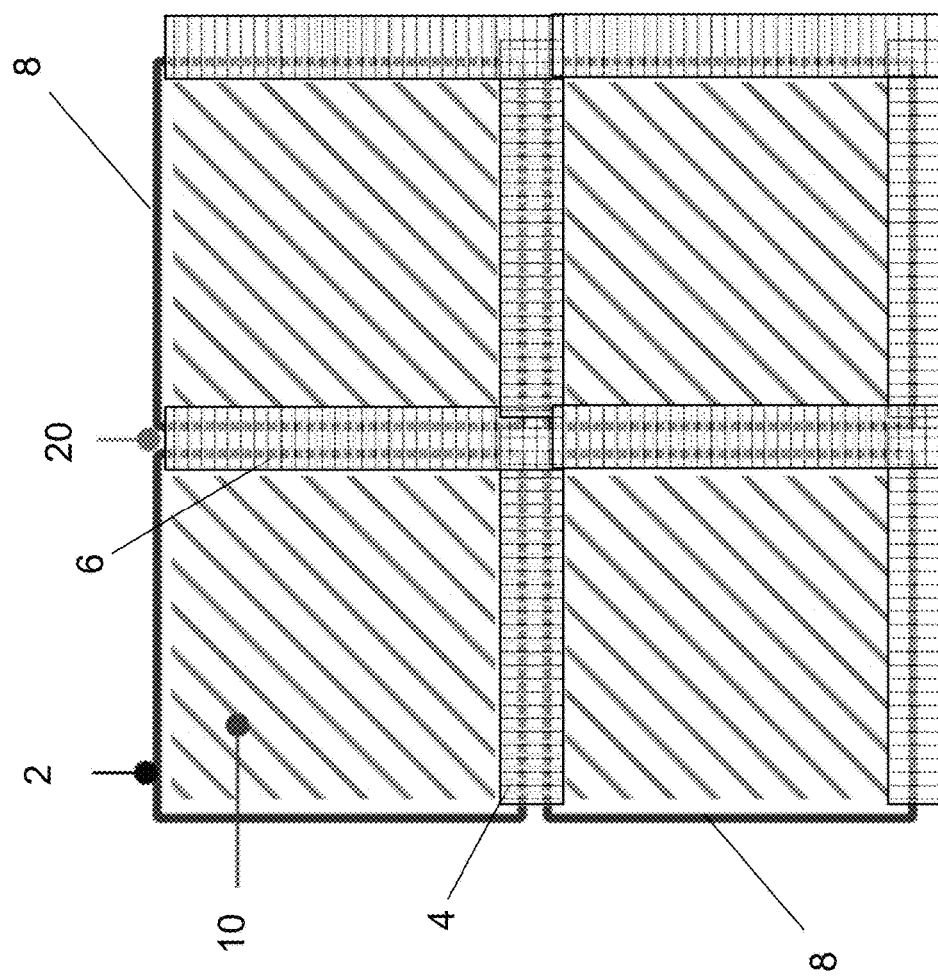
FIG. 1 shows a view of a multi-panel system in accordance with an embodiment of the present invention.

In various exemplary embodiments, the present invention comprises a mesh tape 20 that is bonded to one or more outer edges or outward sides of sheet panel products 2. The mesh tape is applied so that the tape overhangs the edge of the panel for the purpose of adjoining to the adjacent panel following installation of the panels at a job site. In one embodiment, the mesh is applied (as described below) to two edges of the sheet panel, one along the panel width 4 and another along the panel length 6. When installed, the panel edge with the mesh tape applied is overlapped with the edge of an adjacent panel 8 that does not have tape applied, both along the length and width, as seen FIG. 1. The mesh tape extending from an outermost edge of a panel array (and thus not overlapping with an adjacent panel edge) may be cut off or folded under the panel or around a corner or edge, if not needed to extend to an adjacent frame or stud.

The mesh tape may extend for substantially all of the edge on which it is installed. In several embodiments, one or both ends of the mesh tape may extend further beyond the end of the edge, so that mesh tape may overlap and cover areas such as the center area between four corners of four adjacent panels, as seen in FIG. 1, or around corners. The mesh tape extension may be cut off or folded under the panel or around a corner or edge if not needed. The length of the extension may vary. In several embodiments, the length of the extension is approximately equal to the width of tape extending outward from the middle of the edge.

Figure 2:
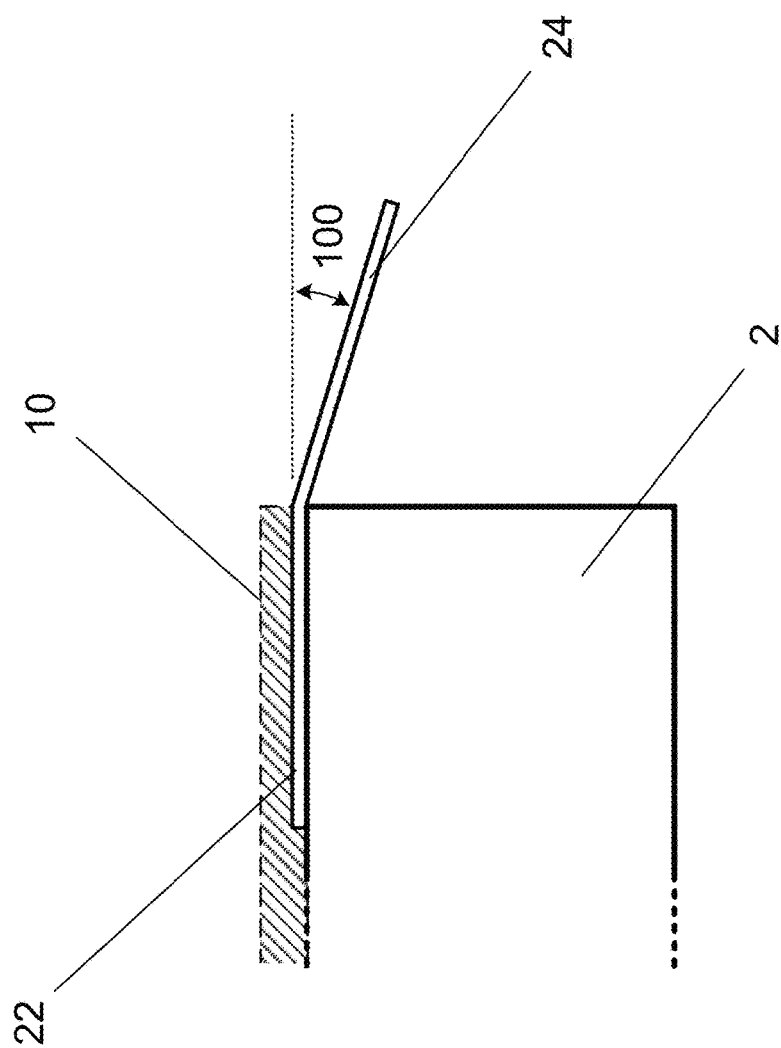
FIG. 2 shows a side view of a panel edge with mesh tape affixed between the top of the panel and the WRB coating or layer.

The present invention thus allows for a faster, more robust and reliable installation. The mesh tape (e.g., fiberglass reinforcing tape) is applied and affixed to the desired sides or edges of a panel during the panel manufacturing process. In one embodiment, the tape is applied directly to the panel prior to application of the factory WRB layer or coating 10. The tape is thereby sandwiched between the base panel and WRB layer or coating, as seen in FIG. 2, and when cured, becomes tightly bonded and integrated to the panel with WRB coating. Additional adhesives and coating thickness may be used to ensure performance. In several embodiments, the product thus comprises a construction panel with factory-applied (or "pre-applied") WRB coating and mesh tape.

Figure 4:
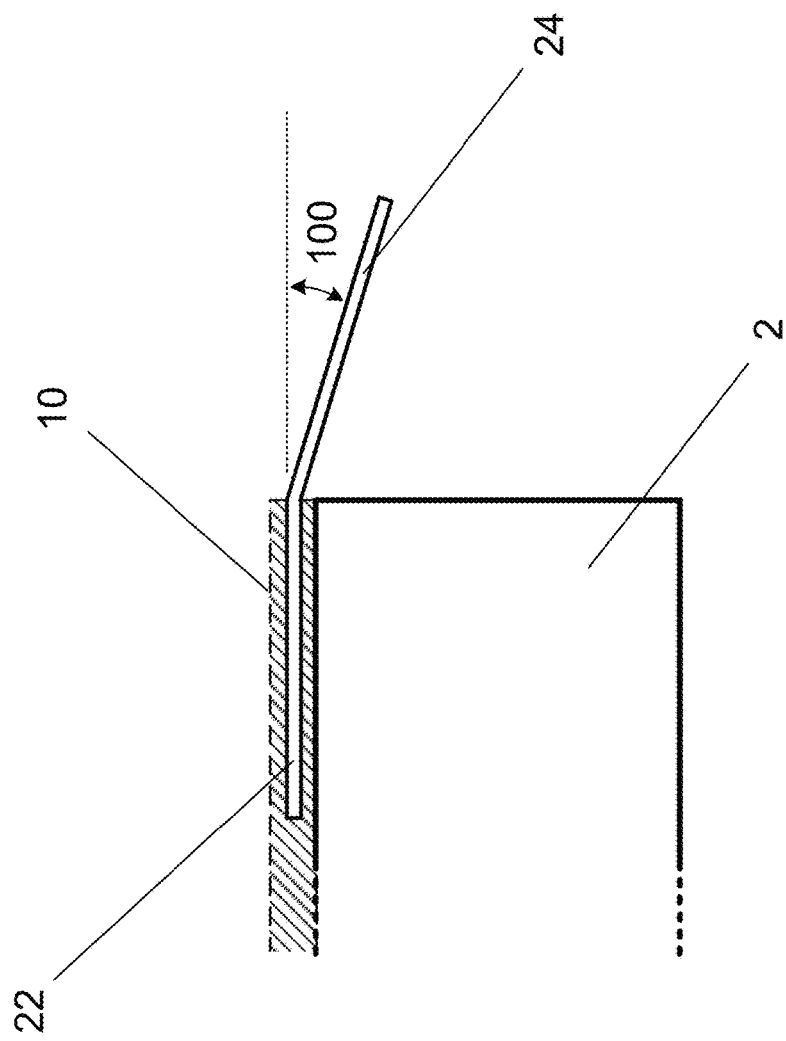
FIG. 4 shows a side view of a panel edge with mesh tape affixed above the top of the panel in the WRB coating or layer.
Figure 5:
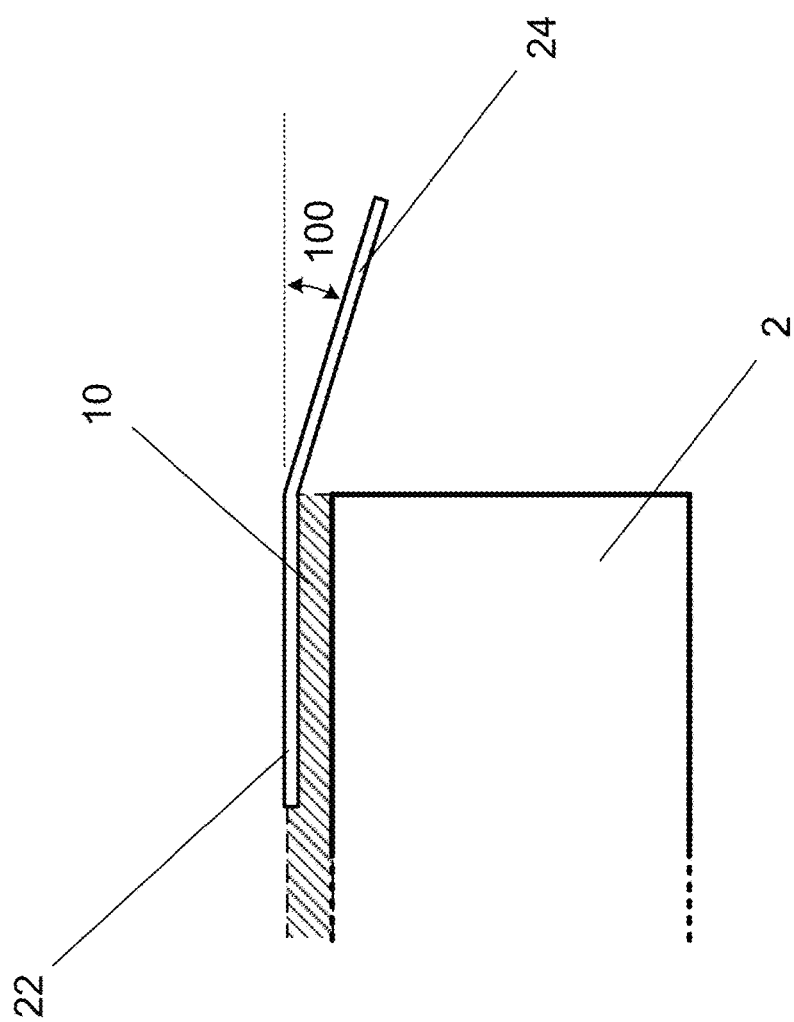
FIG. 5 shows a side view of a panel edge with mesh tape affixed on the top of the WRB coating or layer.

In alternative embodiments, the tape may be applied during or after the WRB application process, so the tape is located in the WRB coating, or on top of the WRB coating, as seen in FIGS. 4 and 5.

In various exemplary embodiments, during the manufacturing process the tape is applied so that up to approximately one half of the width of the tape will be adhered to the panel (i.e., between the base panel and WRB coating), and the remaining portion or half will hang over the panel edge so that it can be joined easily to an adjacent panel during installation.

Furthermore, in several embodiments, while the tape is being applied in the manufacturing process, the side of the tape not in contact with the panel, i.e., that which hangs over the panel edge to later be joined to the adjacent panel during installation at a job site, is set with an angle downward with respect from the panel face. In one embodiment, the angle is approximately 20 degrees. The angle will be permanently set by flexing the free side of the tape downward after the tape is adhered to the panel, and applying the appropriate amount of heat to mold and then set the angle in the tape. When cooled, the downward sloping angle of the tape will require force to flex upward (i.e., the tape has "memory" for the set angle) to become flat with the horizontal face of the panel. The purpose for downward angle of the tape and tape "memory" is to ensure the angled part of the tape lays flat on the adjacent panel during and after installation of the panels. This will ensure that when a fluid applied WRB system is completed in the field that the sealant, whether sprayed or troweled onto the tape, will create a close interaction with the adjacent panel to create a robust sealing system.

Figure 3:
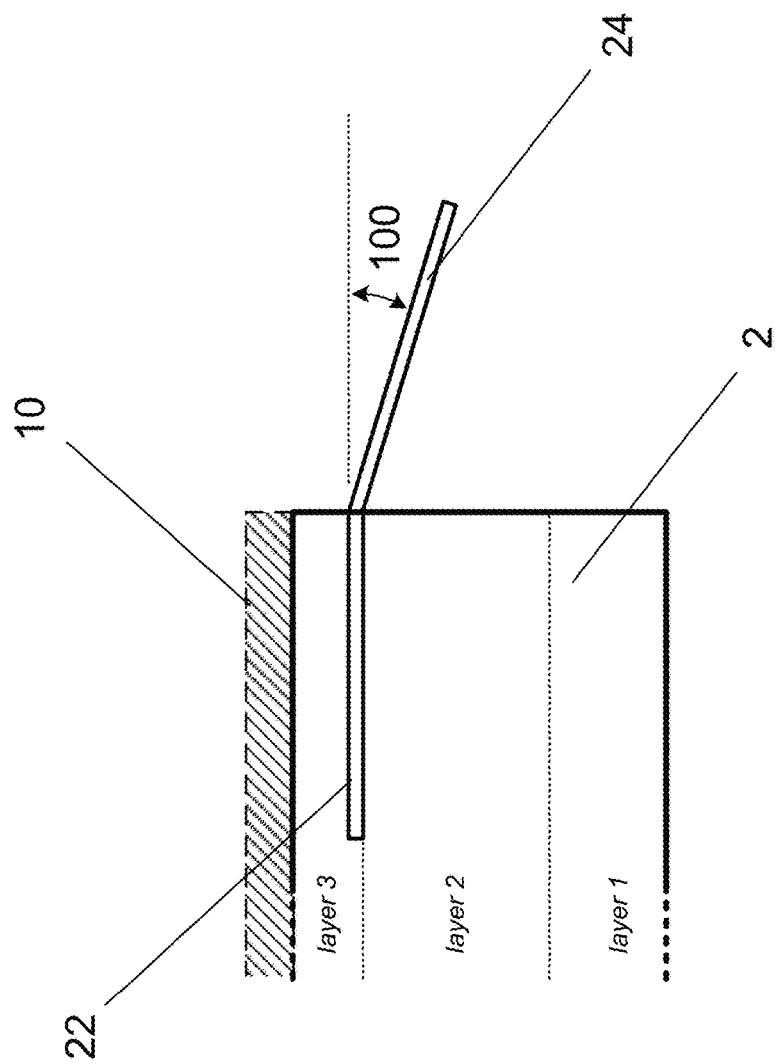
FIG. 3 shows a side view of a panel edge with mesh tape affixed between two layers of the panel.

In an exemplary embodiment, a manufacturing process according to the present invention comprises production of a panel, such as an OSB, through the primary press process, affixing of mesh tape along two adjacent edges of the panel wherein approximately one-half of the mesh tape (longitudinally) is securely affixed to the top panel face along said edges, application (such as by one or more spray nozzles) of a WRB layer or coating on the top panel face, curing, mechanically bending the free side of the mesh tape at a downward angle, and applying heat to set the free side of the tape at that angle. In alternative embodiments, as seen in FIG. 3, the mesh tape is installed between layers in a manufactured wood product (such as OSB), or portions of a mesh tape product are secured between sequential layers of a multi-layer panel.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A panel, comprising:
   an engineered wood multi-layered first panel sheet, wherein the first panel sheet is rectilinear with a front face, a back face parallel to the front face, and four sides, each side extending between the front face and back face;
   a first mesh tape embedded in a first side of the first panel sheet.

2. The panel of claim 1, further comprising a second mesh tape embedded in a second side of the first panel sheet.

3. The panel of claim 2, wherein the second side is adjacent to the first side.

4. The panel of claim 1, wherein the first mesh tape comprises an inner edge and an outer edge, wherein the inner edge is affixed to the front face of the first panel sheet.

5. The panel of claim 4, wherein the inner edge is affixed between the front face of the first panel sheet and a protective coating or layer.

6. The panel of claim 4, wherein the outer edge extends at an angle downward from the front face of the first panel sheet.

7. The panel of claim 4, wherein the outer edge extends a distance sufficient to cover a seam between the first panel sheet and a second panel sheet installed adjacent to the first panel sheet.

8. The panel of claim 1, wherein the first panel sheet is a manufactured wood product with multiple layers, and the mesh tape is water-resistant and comprises an inner edge and an outer edge, wherein the inner edge is affixed between layers of first panel sheet.

9. The panel of claim 1, wherein the mesh tape is embedded in the first side of the first panel sheet prior to installation at a job-site.

10. A panel, comprising:
    an engineered wood first panel sheet, wherein the first panel sheet is rectilinear with a front face, a back face parallel to the front face, and four sides, each side extending between the front face and back face; and
    a first mesh tape embedded in a first side of the first panel sheet;
    wherein the mesh tape comprises an inner edge and an outer edge, wherein the inner edge is affixed to the front face of the first panel sheet; and
    wherein the outer edge extends at an angle downward from the front face of the first panel sheet.

11. The panel of claim 10, wherein the outer edge extends a distance sufficient to cover a seam between the first panel sheet and a second panel sheet installed adjacent to the first panel sheet.

12. The panel of claim 10, wherein the first mesh tape is embedded in the first side of the first panel sheet during a manufacturing process of the first panel sheet.

13. The panel of claim 10, wherein the first mesh tape is affixed to the first panel sheet prior to installation of the panel sheet on a wall, structure or frame.

14. The panel of claim 10, wherein the first mesh tape is factory-installed.

15. The panel of claim 10, further comprising a second mesh tape embedded in a first side of the first panel sheet.

16. The panel of claim 10, wherein the first mesh tape is water-resistant.

17. The panel of claim 15, wherein the second mesh tape is water-resistant.

18. The method of claim 10, wherein the angle downward is approximately 20 degrees.

19. The method of claim 6, wherein the angle downward is approximately 20 degrees.

* * * * *